July 8, 1947.                G. WALTHER ET AL                2,423,743
                        FIFTH WHEEL COUPLING MEANS
            Original Filed Aug. 5, 1940        3 Sheets-Sheet 1

Patented July 8, 1947

2,423,743

UNITED STATES PATENT OFFICE 2,423,743

FIFTH WHEEL COUPLING MEANS

George Walther and Elmer L. Miller, Dayton, Ohio, assignors to The Dayton Steel Foundry Company, Dayton, Ohio, a corporation of Ohio Original application August 5, 1940, Serial No. 351,540. Divided and this application August 1, 1944, Serial No. 547,538

9 Claims. (Cl. 280—33.1)

This application is a division of our co-pending application Serial No. 351,540, filed August 5, 1940, now Patent No. 2,359,498 issued October 3, 1944, for Tractor-trailer coupling means. The present application is directed particularly to the resilient mounting of the locking jaw parts and other king pin engaging parts with respect to the fifth wheel upon which said parts are carried.

This invention relates to the art of tractor and semi-trailer combination vehicles, wherein the same are connected through articulated means such as the commonly employed fifth wheel structure. This fifth wheel structure usually includes a lower fifth wheel member on the tractor and an upper fifth wheel member on the forward end of the trailer, which rests upon the lower fifth wheel on the tractor, the vehicles, when in coupled relation for road travel, being connected through a swivel connection provided by a king pin carried by one of the fifth wheel members and locked to the other by means of suitable locking means carried by the latter.

One of the fifth wheel members is preferably mounted to rock about a horizontal axis disposed transversely of the vehicle upon which it is mounted. It is usual today to provide the lower fifth wheel with such rocking mounting and the mounting of the lower fifth wheel is such that when the vehicles are disconnected, the lower fifth wheel normally inclines rearwardly to provide an inclined plane for elevating the forward end of the trailer when the tractor backs into it in coupling.

In the coupling of tractor and semi-trailers provided with the fifth wheel coupling means herein referred to, the same are subject to considerable shock incident to the contact of the fifth wheel plates and the contact of the king pin with the locking jaws when the tractor backs into the trailer for coupling. Likewise, during travel, the coupled relation of the fifth wheels is productive of considerable noise and clatter, as well as wear of certain parts, notably the interengaging portions of the king pin and locking jaws.

The king pin, which is usually mounted on the upper trailer fifth wheel is provided with a circumferential groove near its lower end with which a part of the fifth wheel locking mechanism is adapted to engage to prevent vertical displacement of the king pin from locking engagement with the lower fifth wheel when the vehicles are in coupled relation, and this king pin constitutes the swivel connection between the vehicle fifth wheels enabling the tractor fifth wheel to turn about a vertical axis relative to the trailer fifth wheel.

It is a principal object of the present invention to eliminate the aforementioned shock and noise as much as possible by providing resilient or cushioned mountings of the locking jaw parts and of other king pin engaging parts with respect to the fifth wheel upon which said parts are carried.

Alternative modes of accomplishing the foregoing object are disclosed herein. According to one embodiment of the invention, the locking jaw and other king pin engaging parts are separately resiliently mounted with respect to the fifth wheel upon which said parts are carried. In another embodiment, the locking jaw and other king pin engaging parts are all mounted upon a common supporting means which, in turn, is resiliently mounted with respect to the fifth wheel upon which said common means is carried.

Other objects and advantages and features of novelty will appear more fully as the description of this invention progresses, in conjunction with the accompanying drawings, in which.

Figure 1:
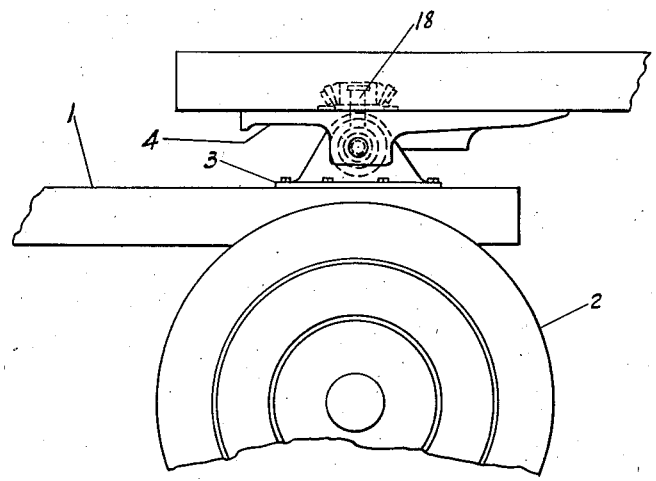
Figure 1 is a side elevational view showing the rear end of a tractor and the forward end of a trailer in coupled relation and embodying the invention.

The numeral 1 designates the frame of a tractor vehicle, and 2 the rear driving wheels thereof. Mounted upon the frame 1 of the tractor are brackets 3 for supporting the lower fifth wheel 4 upon the tractor.

The lower fifth wheel 4 is provided with rearwardly extending wings 15, which define a V-shaped slot leading into a socket 16, at the inner end of the slot which is toward the center of the fifth wheel.

During coupling of the tractor and trailer, the upper fifth wheel king pin 18 is received within the confines of the V-shaped slot provided by the wings 15, when the lower fifth wheel is raised to horizontal position by engagement of the upper fifth wheel bolster plate 19 therewith, as the tractor backs into the trailer and the king pin 18 ultimately comes to seat in the socket 16, and is locked therein by suitable locking means.

This locking means may comprise a hook or jaw member 20 pivoted to the fifth wheel 4, as at 21. The socket 16 is provided with an abutment 22 having an arcuately curved portion which together with the arcuately curved socket portion 23 of the jaw 20 closely engages the king pin when the parts are in the position shown in Figure 2 to maintain the king pin locked in the fifth wheel socket, by means such as now to be described.

Figure 2:
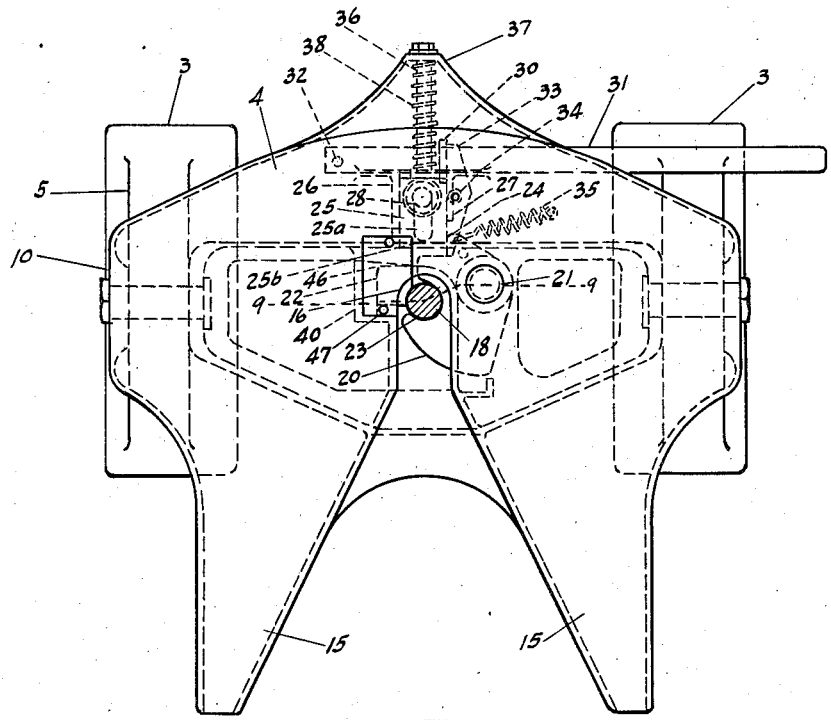
Figure 2 is a top plan view of the lower fifth wheel embodying certain features of the invention.

The jaw 20 is normally maintained in the position shown in Figure 2 by the engagement of an abutment 24 on the jaw member with a plunger 25 mounted for sliding movement between opposing bosses 26 and 27 and secured to the fifth wheel by means of a bolt 28 extending through an elongated slot 25a in said plunger. The plunger is provided with an extension 30 having an angularly disposed portion engaging with a lever 31 pivoted to the fifth wheel as at 32. An arm 33, centrally pivoted, as at 34, to the fifth wheel, engages an offstanding shoulder 25b of the plunger 25, and one end of said arm 33 is tensioned by a spring 35. The plunger 25 is provided with a rod extension 36 extending through an aperture in the vertical web 37 at the forward end of the fifth wheel 4. Surrounding this rod extension 36 is a coil spring 38, one end of which bears against the forward end of the plunger 25, and the other end of which bears against the web 37.

When the vehicles are to be uncoupled to release the king pin 18 from locked engagement with the jaw 20, indicated by Figure 2, the lever 31 is actuated to move the plunger 25 forwardly of the fifth wheel against the compression of the spring 38 until shoulder 25b of the plunger 25 is free of the arm 33, whereupon the latter is moved about its pivot by the spring 35 to a position in which it engages behind the shoulder 25b of the plunger 25, to maintain the latter free of the abutment 24 of the jaw 20 enabling the jaw to turn freely about its pivot 21 so as to release the king pin 18 from the position indicated by Figure 2 and permit the tractor to move away from the trailer.

Figure 5:
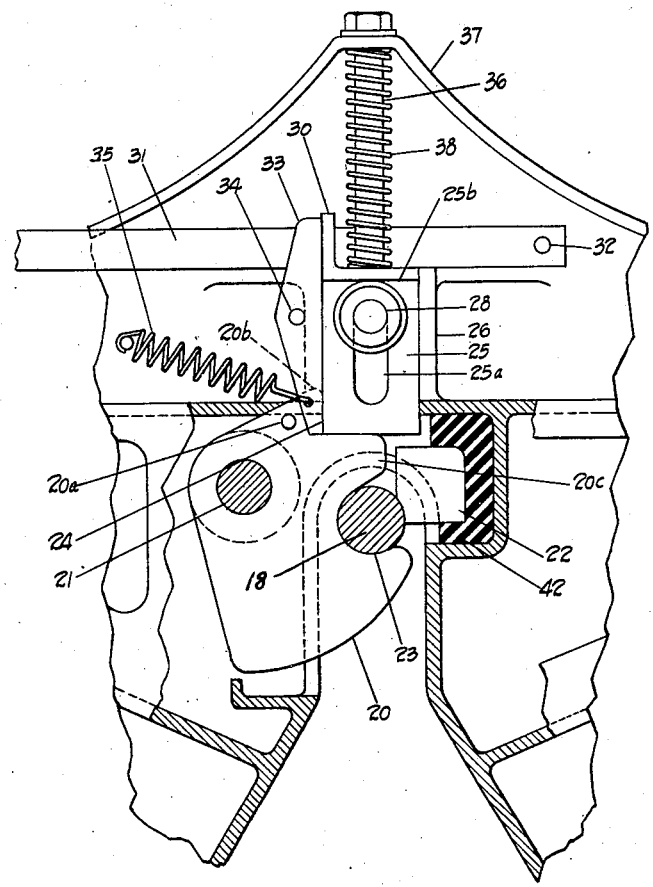
Figure 5 is a bottom plan view of a portion of the lower fifth wheel, with portions broken away.

As the tractor moves away from the trailer in uncoupling, the king pin 18 engages jaw 20 and rotates same clockwise (Figure 5) causing portion 20b of the jaw 20 to move into the path of the rear end of the plunger 25. Further clockwise movement of the jaw 20 causes pin 20a (upstanding from jaw 20) to engage arm 33 rotating the latter counterclockwise to the position of Figure 5 out of engagement with the shoulder 25b of the plunger. This permits the plunger to be moved rearwardly under action of spring 38 until the plunger abuts against portion 20b of the jaw 20 to maintain the latter in this position, which is the coupling position. In this coupling position the hook portion 23 is out of the path of movement of the king pin 18. When the tractor and trailer vehicles again come together in coupling, king pin 18 engages portion 20c of jaw 20, rotating same counterclockwise (Figure 5) causing hook portion 23 of the jaw 20 to lock behind king pin 18 as shown in Figure 5. When the jaw 20 has been rotated to this latter position, the portion 20b will be disengaged from the rear end of the plunger 25, allowing the plunger to move rearwardly to the position of Figure 5 in which the side of the plunger engages the shoulder 24 of the jaw 20 to maintain the latter in locked position.

Figure 3:
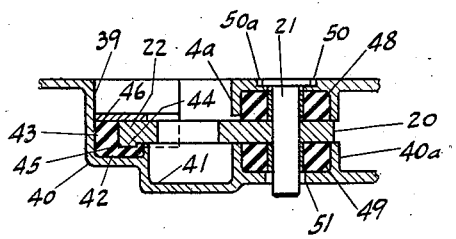
Figure 3 is a partial vertical section taken on the line 9—9 of Figure 2, with the king pin omitted.

Resilient mountings are provided for the locking jaw 20 and the abutment 22 to cushion the same relative to the fifth wheel 4 and thus minimize shock incident to engagement of the king pin with such parts during coupling of the tractor and trailer vehicles, as well as during travel of said vehicles in coupled relation. Figures 2 and 3 will now be referred to.

The fifth wheel 4 is provided with a recess 39 formed by a web 40 having a pocket 41 therein for accommodating the king pin 18 when the same is received in locked position at the inner end of the socket 16. Formed in this recessed portion 39 also is a pocket 42 for the accommodation of a body of resilient material 43, such as rubber or the like, which in turn is formed with a pocket 44 therein which is adapted to receive the depending portion 45 of the plate forming the abutment member 22, so that this abutment plate is resiliently cushioned respecting the fifth wheel 4.

A cover plate 46 secured to the web 40 by means of suitable bolts 47 serves to maintain the rubber body 43 and the abutment plate 22 in proper position.

Formed on the under surface of the fifth wheel 4 and on the upper surface of the web 40 are hollow bosses 4a and 40a respectively for receiving bodies of resilient material 48 and 49, such as rubber or the like. Centrally of said bosses, there are provided in the main portion of the fifth wheel bolster plate and in the web 40 apertures 50 and 51 respectively for receiving the stud bolt 21 upon which the locking jaw 20 is mounted. The apertures 50 and 51 are of slightly larger diameter than the stud bolt 21 and a corresponding amount of clearance is provided at 50a for the head of said bolt to permit a certain amount of movement of the bolt 21 and its associated locking jaw 20 relative to the fifth wheel, which movement is cushioned by the rubber bodies 48 and 49.

Figure 4:
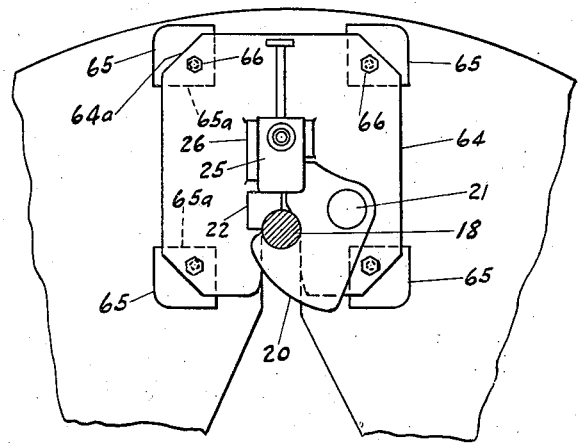
Figure 4 is a top plan view of a portion of a fifth wheel member embodying a modification of the invention.

A modified form of resilient mounting for the locking jaw and abutment parts 20 and 22, respectively, is shown in Figure 4, wherein these parts are secured to a plate 64 which is resiliently mounted relative to the lower fifth wheel bolster plate 4' upon cushion pads 65 which may be of rubber or any other suitable resilient material. These pads 65 may be positioned as shown at the four corners of the plate 64 and may be formed with a part cut away and conforming to the configuration of the corners 64a of the plate 64 to provide inset shelf portions 65a upon which the corners 64a of the plate 64 may rest inset so that the upper surfaces of the pads 65 and the plate 64 will be flush. The plate 64 is secured to the fifth wheel by means of bolts 66 passing through the rubber pads into the fifth wheel body 4'. The cutting away of the pads 65, as before mentioned, provides a vertical shoulder thereon engaging the corners 64a of the plate 64 which aids in maintaining the plate 64 in proper position upon the pads 65.

It will be noted that in Figure 4 the plunger mechanism 25 is mounted upon the plate 64 to slide between the bosses or ribs 26 and 27 formed upon the upper side of said plate 64.

Having thus described our invention, what we claim as new and desire to secure by Letters Patent of the United States is:

1. In coupling means for tractor-trailer vehicles, in combination, a fifth wheel member for cooperation with a king pin, coupling means on the fifth wheel comprising a jaw adapted to be impinged by and to lock a king pin into cooperation with the fifth wheel, a supporting plate carrying said jaw, and resilient means mounting said supporting plate with respect to said fifth wheel, said resilient means permitting yielding movement of the supporting plate relatively to the fifth wheel incident to impingement and locomotion stresses transmitted to the jaw through the king pin.

2. In tractor-trailer coupling means, in combination, a fifth wheel member having a king pin receiving socket portion therein, means for locking a king pin in said portion and comprising locking jaw and abutment elements positioned respecting said socket portion for cooperative engagement with such king pin, a supporting plate carrying said jaw and abutment elements, and resilient means for mounting said supporting plate with respect to said fifth wheel, said resilient means permitting yielding movement of the supporting plate relatively to the fifth wheel member incident to impingement and locomotion stresses transmitted to said elements through the king pin.

3. In tractor-trailer coupling means, in combination, a fifth wheel member having a king pin receiving socket portion therein, means for locking a king pin in said portion and comprising locking jaw and abutment elements positioned respecting said socket portion for cooperative engagement with such king pin, and plunger means cooperable with said jaw for maintaning the same in locking engagement with such king pin, a supporting plate carrying said jaw and abutment elements and said plunger means, and resilient means for mounting said supporting plate with respect to said fifth wheel, said resilient means permitting yielding movement of the supporting plate relatively to the fifth wheel member incident to impingement and locomotion stress transmitted to said elements through the king pin.

4. In tractor-trailer coupling means, in combination, a fifth wheel member having a king pin receiving socket therein, means for locking a king pin in said socket portion and comprising a locking jaw cooperating therewith, means for pivoting said jaw to said fifth wheel member and comprising a pivot member, said jaw being rotatably mounted by said pivot member, and said fifth wheel member being provided with spaced apertures for receiving said pivot member, said apertures providing clearance for the pivot member whereby to permit limited lateral movement of the pivot member in said apertures, and means for cushioning said lateral movement and comprising bodies of rubber or the like material housed on said fifth wheel member.

5. In tractor-trailer coupling means, in combination, a fifth wheel member having a king pin receiving socket therein, means for locking a king pin in said socket portion and comprising a locking jaw cooperating therewith, means for pivoting said jaw to said fifth wheel member and comprising a pivot member, said jaw being rotatably mounted by said pivot member, and said fifth wheel member being provided with spaced apertures for receiving said pivot member, said apertures providing clearance for the pivot member whereby to permit limited lateral movement of the pivot member in said apertures, and means for cushioning said lateral movement and comprising bodies of rubber or the like material closely impinging the pivot member and opposite sides of said jaw member and housed on said fifth wheel member.

6. Tractor-trailer coupling means as claimed in claim 4, wherein the means for locking the king pin comprises said jaw and an abutment element arranged for cooperative engagement with such king pin and wherein the fifth wheel member includes a web portion providing a pocket adjacent the king pin receiving socket, a body of rubber or the like material received in said pocket, said last mentioned body being formed with a pocket receiving a portion of said abutment element, and means for maintaining said body and said abutment element in proper position.

7. Coupling means as claimed in claim 1, wherein the resilient mounting means comprises pads of rubber or the like material, said pads being undercut to provide shoulders engaging the edges of the supporting plate.

8. In tractor-trailer coupling means, in combination, a fifth wheel member having a king pin receiving socket portion therein, means for locking the king pin in said socket portion and comprising locking jaw and abutment elements positioned respecting said socket portion for cooperative engagement with such king pin, said fifth wheel member including a web portion providing a pocket adjacent the king pin receiving socket, a body of rubber or the like material received in said pocket, said last mentioned body being formed with a pocket receiving a portion of said abutment element, and means for maintaining said body and said abutment element in proper position.

9. In tractor-trailer coupling means, in combination, a fifth wheel member having a king pin receiving socket therein, means for locking a king pin in said socket portion and comprising a locking jaw cooperating therewith, means for pivoting said jaw to said fifth wheel member and comprising a pivot member, said jaw being rotatably mounted by said pivot member, and means for cushioning said jaw and pivot member with respect to said fifth wheel member, said means comprising bodies of rubber or the like material closely impinging the pivot member on opposite sides of said jaw member and housed on said fifth wheel.

GEORGE WALTHER.
ELMER L. MILLER.

REFERENCES CITED

The following references are of record in the file of this patent:

UNITED STATES PATENTS

| Number | Name | Date |
| --- | --- | --- |
| 2,015,313 | Kinne | Sept. 24, 1935 |
| 2,096,282 | Kortering | Oct. 19, 1937 |